(12) United States Patent
Han

(10) Patent No.: US 8,292,123 B2
(45) Date of Patent: Oct. 23, 2012

(54) APPARATUS AND METHOD FOR SYNCHRONIZED FLOW FROM VOLUMETRIC TANKS

(75) Inventor: Leon Han, San Jose, CA (US)

(73) Assignees: ZhangJiaGang Chemflow Technology Co., Ltd., ZhangJiaGang, Jiangsu (CN); Checmflow Systems, Inc., San Jose, CA (US)

( * ) Notice: Subject to any disclaimer, the term of this patent is extended or adjusted under 35 U.S.C. 154(b) by 611 days.

(21) Appl. No.: 12/541,955

(22) Filed: Aug. 16, 2009

(65) Prior Publication Data

US 2011/0036866 A1 Feb. 17, 2011

(51) Int. Cl.
*B67D 7/74* (2010.01)
(52) U.S. Cl. ............ 222/129; 222/14; 222/20; 222/71; 222/135; 222/145.5
(58) Field of Classification Search ............ 222/14, 222/129, 135, 145.5, 145.6, 71, 64–65, 69, 222/481.5, 485, 488, 16, 20, 55, 133
See application file for complete search history.

(56) References Cited

U.S. PATENT DOCUMENTS

| | | | | |
|---|---|---|---|---|
| 3,010,316 A * | 11/1961 | Snyder | ............................ | 73/203 |
| 3,182,799 A * | 5/1965 | Kroffa | ........................... | 210/802 |
| 3,572,654 A * | 3/1971 | Jaeger | ........................ | 366/162.1 |
| 3,905,394 A * | 9/1975 | Jerde | ........................ | 137/599.04 |
| 3,957,083 A * | 5/1976 | Gallo | ................................ | 138/43 |
| 4,352,679 A * | 10/1982 | Notardonato et al. | .......... | 95/245 |
| 4,737,037 A * | 4/1988 | Mojonnier | ................. | 366/152.1 |
| 6,027,240 A * | 2/2000 | Han | .............................. | 366/101 |
| 6,270,246 B1 * | 8/2001 | Han | .............................. | 366/131 |
| 7,757,891 B2 * | 7/2010 | Han et al. | ........................ | 222/64 |
| 2005/0058016 A1 * | 3/2005 | Smith et al. | ................ | 366/152.1 |
| 2008/0219779 A1 * | 9/2008 | Parkinson | ..................... | 406/137 |

* cited by examiner

*Primary Examiner* — Frederick C. Nicolas
(74) *Attorney, Agent, or Firm* — Joe Zheng; Wuxi SinolPs Agency, Ltd.

(57) ABSTRACT

Techniques for mixing liquids in a specific ratio at synchronized flows are disclosed. According to one aspect of the present invention a dispensing system comprises a plurality of tanks, each of the tanks includes an overflow outlet to limit a liquid therein to a certain measurement, and an array of volumetric outlets spaced apart and vertically arranged. The corresponding overflow outlet and the volumetric outlets of the tanks are located at the same height. The dispensing system further comprises a dispensing assembly including a manifold coupled to the volume outlets of the tanks via respective pipes, and further a flow-regulating device in at least one but not all of the pipes to control a flow of the liquid coming downwards from each of the tanks through one of the volumetric outlets thereof.

20 Claims, 3 Drawing Sheets

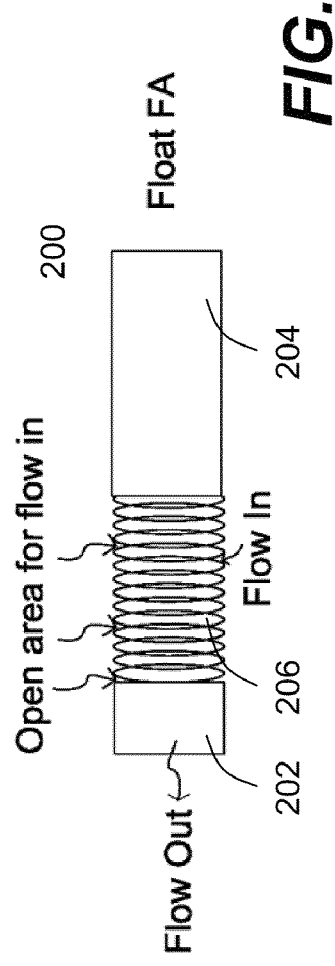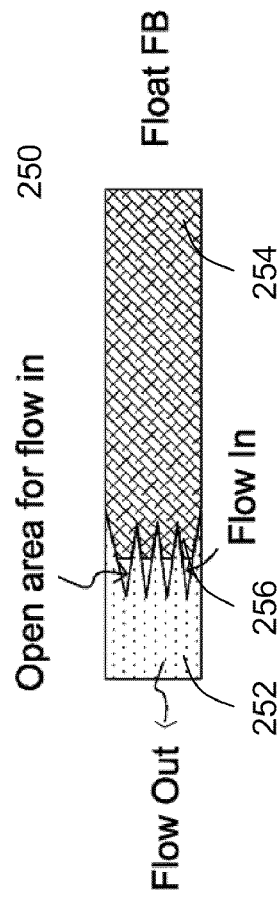

APPARATUS AND METHOD FOR SYNCHRONIZED FLOW FROM VOLUMETRIC TANKS

BACKGROUND OF THE INVENTION

1. Field of the Invention

The invention is generally related to the area of liquid flow and dispensing. More particularly, the present invention is related to synchronized flow from two or more volumetric tanks.

2. The Background of Related Art

There are many applications in which various liquids need to be mixed with precise ratios. Dispensing specific amounts of liquids per a rate controls the formulation of a liquid mixture. The process is traditionally achieved through the use of either balance scales or metering pumps. Metering pumps have the additional capability of providing not only a specific amount of liquid, but also a specific flow rate of liquid. However, both of these devices need to be recalibrated periodically in order to keep accuracy. If a balance scale or metering pump was found to be out of calibration, all measurements since the last calibration could be questionable, potentially leading to recalls and remanufacture of suspected products from the balance scale or metering pump.

Gasoline and ethanol are commonly combined in specific ratios as a motor fuel. Variability in the ratio may cause undesirable variation in the properties of the motor fuel. Gasoline and ethanol are not combined until being shipped from a terminal to a local retailer as the ethanol component increases the solubility of impurities from the surrounding environment. A variety of methods are employed to fill tanks with a specific ratio and amount of gasoline and ethanol in a delivery truck.

One method to obtain a specific ratio of two liquids in a common storage tank is to transfer a specific amount of one liquid, and then subsequently transfer a specific amount of another liquid to the same tank. This method is frequently used because no special equipment is required. One of the disadvantages to this method is that the accuracy of the ratio depends on the accuracy of the device(s) that meters the amount of each liquid transferred. Another one of the disadvantages is that if the two liquids are not miscible to a large degree, then the two liquids may remain segregated as two distinct phases in the common tank unless some sort of mixing apparatus is applied.

The above method is commonly used to sequentially transfer ethanol and gasoline to tank trucks at a distribution terminal prior to delivery to motor fuel retailers. This technique is colloquially referred to as "splash blending", on the assumption that the liquid splashing around in the tank will cause it to mix homogenously. However, the gasoline and ethanol are often not well mixed upon delivery to a storage tank at a retailer, which has potentially serious negative implications for motor vehicles that may not tolerate a motor fuel with too much ethanol.

Still another disadvantage of this method is a possibility of inadvertently beginning the transfer of the two liquids in uncontrolled flows in a receiving tank, causing a blend with the incorrect ratio of the two components. Blending two chemicals with an incorrect ratio could cause an unwanted result.

Alternatively, the two liquids are pumped at controlled flow rates resulting in a desired ratio. This method depends on two separate liquid flow controllers to maintain a sufficient degree of accuracy to achieve the required ratio. The accuracy of liquid flow controllers, like many electronic measuring devices, can drift over time from acceptable levels, and can require periodic calibration and possibly other preventive or corrective maintenance measures. If the calibration has been found to have deviated from acceptable levels, the quality of all mixtures made since the last calibration are now in question.

Therefore, there is a great need for techniques of measuring and controlling both the dispensing of liquid amounts and liquid flow rates thereof, without the need for periodic recalibration.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques of dispensing multiple liquids in a specific ratio by synchronizing respective flows of the liquids from volumetric tanks. According to one aspect of the present invention a dispensing system comprises a plurality of tanks, each of the tanks includes an overflow outlet to limit a liquid therein to a certain measurement, and an array of volumetric outlets spaced apart and vertically arranged. The corresponding overflow outlet and the volumetric outlets of the tanks are located at the same height. The dispensing system further comprises a dispensing assembly including a manifold coupled to the volume outlets of the tanks via respective pipes, and further a flow-regulating device in at least one but not all of the pipes to control a flow of the liquid coming downwards from each of the tanks through one of the volumetric outlets thereof.

Different from the prior art mixing mechanisms that often employ a large volume to blend liquids from different containers without considering the flows that could be well off a required ratio, by using one embodiment of the present invention, liquids, especially chemical components, can be mixed starting from the flows that are respectively controlled in accordance with the ratio.

The present invention has many applications, for example, in petroleum. One embodiment of the present invention may be used to effectively mix gasoline and ethanol to a specific ratio. Other objects, features, and advantages of the present invention will become apparent upon examining the following detailed description of an embodiment thereof, taken in conjunction with the attached drawings.

BRIEF DESCRIPTION OF THE DRAWING

These and other features, aspects, and advantages of the present invention will become better understood with regard to the following description, appended claims, and accompanying drawings where:

FIG. 2A and FIG. 2B each show an exemplary flow-regulating device that may be used in FIG. 1.

DETAILED DESCRIPTION OF THE PREFERRED EMBODIMENTS

The detailed description of the present invention is presented largely in terms of procedures, steps, logic blocks, processing, or other symbolic representations that directly or indirectly resemble the operations of fluid mixing, delivery and control. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
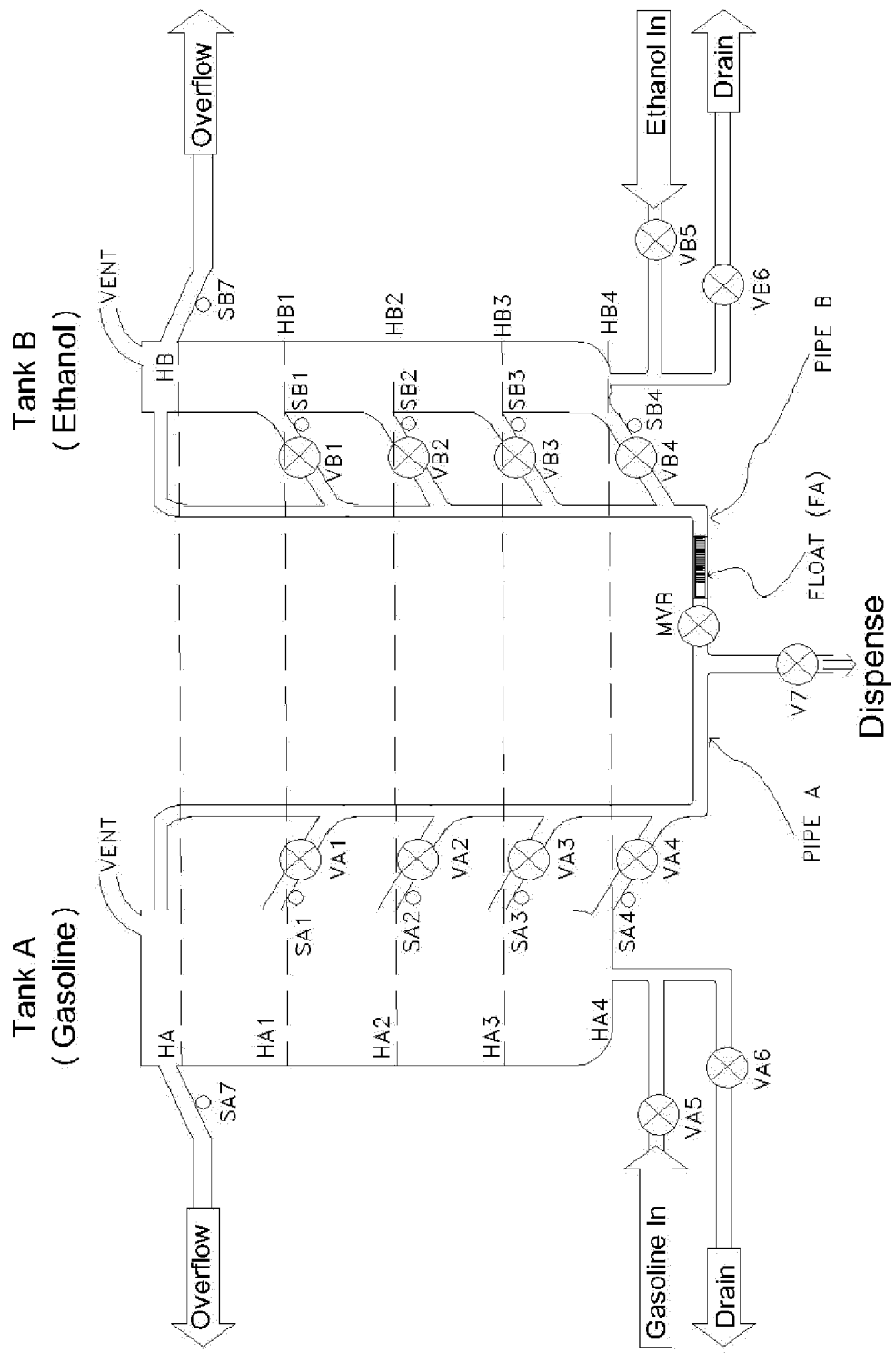
FIG. 1 shows an illustration of two types of liquids (e.g., gasoline and ethanol) from two respective tanks are being mixed at a predefined ratio, where the two tanks may be in different sizes.

Embodiments of the present invention are discussed herein with reference to FIGS. 1-2B. However, those skilled in the art will readily appreciate that the detailed description given herein with respect to these figures is for explanatory purposes only as the invention extends beyond these limited embodiments.

Referring now to the drawings, in which like numerals refer to like parts throughout the several views. FIG. 1 shows s configuration of mixing two types of liquids (e.g., gasoline and ethanol) from two respective tanks at a predefined ratio, where the two tanks may be in different sizes. For illustration purpose, a larger tank for gasoline is labeled as Tank A. A smaller tank for ethanol is labeled as tank B. Tank A and Tank B are connected via a dispensing manifold including Pipe A and Pipe B.

A manual valve MVB for setting a coarse flow and a self-adjusting flow-regulating device (Float) are installed in Pipe B. Each tank has an overflow outlet at the same height, labeled HA and HB, for Tank A and Tank B, respectively. Four additional outlets, called volumetric outlets herein, are arranged vertically downwards, for example, HA1, HA2, HA3, and HA4 for Tank A, respectively. Tank B has a similar arrangement of volumetric outlet valves at essentially the same heights, labeled as HB1, HB2, HB3, and HB4, respectively. Each outlet valve on each tank, as well as the overflow point on each tank, is equipped with a sensor to detect an actual liquid flow. These sensors can be employed by a control system to remotely activate corresponding required valves.

As shown in FIG. 1, each tank is provided with an overflow port near the top of the tank. In one embodiment, each overflow port is at the same vertical height as the other tank. At any particular height, the surface area of each tank has the same ratio with respect to the other tank. Each tank is filled until the excess liquid overflows, to ensure the maximum or a required volume is achieved in the tank. The excessive liquid exiting the overflow port or outlet will be reserved in an external standpipe or vessel for later re-use. Typically, a sensor for detecting a liquid flow through an overflow port may be used to indicate that this state has been achieved. There are many commercially available types of sensor that can be used.

These one or more outlets, or dispensing volumetric ports, arranged vertically along one side of each tank at specifically chosen locations correspond to specific volumes of liquid between the overflow port and a specific dispensing port. Each outlet is supplied with a valve to prevent liquid from flowing out through this port unless required. When a specific valve is opened, the volume of liquid above this valve and below the overflow point flows down this outlet pipe, delivering a specific volume of that liquid.

FIG. 1 only shows a configuration involving two tanks Tank A and Tank B. Those skilled in the art understand that the description herein is equally applicable to more than two tanks. Accordingly, each additional tank is of similar design and is also equipped with dispensing ports at the same heights as the first tank, varying only in diameter.

Each dispensing tube joins to a common manifold prior to dispensing the liquid into a receiving tank (not shown). In one or more of the pipes feeding into the manifold is a manual valve and a mechanical device which self-adjusts to control the flow of liquid through its pipe.

In operation, after several vertical tanks are filled to the same height, an outlet valve on each tank, at the same height as the others, is opened. Corresponding liquids flow down the individual outlet pipes and join into a common flow via a manifold. With a suitable flow-regulating device (e.g., a float) and a manual valve placed in one or more of the individual outlet pipes, the liquid height in each tank will be the same during the dispensing, thus achieving the synchronized liquid dispense from all tanks. This ensures that the ratio of each liquid in the coming streams exiting the manifold will be unchanged.

FIG. 2A shows an exemplary flow-regulating device 200, labeled as float FA. The flow-regulating device 200 is a float with a mid-section in the form of coiled spring interposed between a first end 202 and a second end 204. Although it appears in FIG. 2A that the first end 202 appears shorter while the second end 204 appears longer, it should be noted that a limitation is not necessary. According to one embodiment, the first end is hollow to allow a fluid to pass though while the second end is sealed to block a fluid to pass though so that the second end is forced to react in responding to a pressure in the liquid.

In operation, a flowing liquid approaches the flow-regulating device 200 from the direction of the long end 204, passes over the exterior of the long end 204, and transits through the openings of the coiled spring 206, into the body of the flow-regulating device, and exits out an opening in the far end with the shorter stud. The upstream end of the flow-regulating device, namely the long end 204, can move back and forth but the downstream end (i.e., the short end 202) is mechanically fixed in place. In other words, the flow-regulating device 200 operates in accordance with the pressure from the liquid. If the pressure coming from the liquid is increased (faster flow), the long end 204 is pushed to decrease the openings of the coiled spring 206, thus reducing the flow. Likewise, if the pressure coming from the liquid is decreased (slower flow), the long end 204 is released to increase the openings of the coiled spring 206, thus increasing the flow.

FIG. 2B shows another exemplary flow-regulating device 250, labeled as float FB. The flow-regulating device 250 includes two parts a short stud 252 and a long stud 254. The two studs 252 and 254 close up or down using grooves, thus leaving openings through the grooves. In similar fashion to float FA, float FB is provided to have the downstream end (i.e., the short stud 252) fixed in place and the upstream end (i.e., the long stud 254) able to move back and forth towards the short stud 252) in response to the pressure in the fluid flow. According to one embodiment, the upstream and downstream ends overlap in a telescoping fashion, with the two sections 252 and 254 having to flex inward and outward, respectively, in order to accomplish the movement of the upstream end in the downstream direction.

When the upstream end is pushed downstream, the amount of overlapping between the two sections increases, and reduces the amount of opening from the grooves, causing the reduction of the liquid passing through the short stud 252. As the flow rate is reduced, the pressure acting on the upstream end is reduced, and the overlapping between the two sections increases to push the upstream end back against the flowing liquid, to again increase the throughput of the liquid through the short stud 252.

The flow-regulating device 200 or 250 works in according with the pressure in the flow. According to one embodiment, the float may be constructed of a compressible material, for example, an elastomer, with perforated or porous side walls. When under compression from excessive fluid flow, the pores or perforations are compressed, limiting the amount of fluid permitted to flow through the device.

Figure 3:
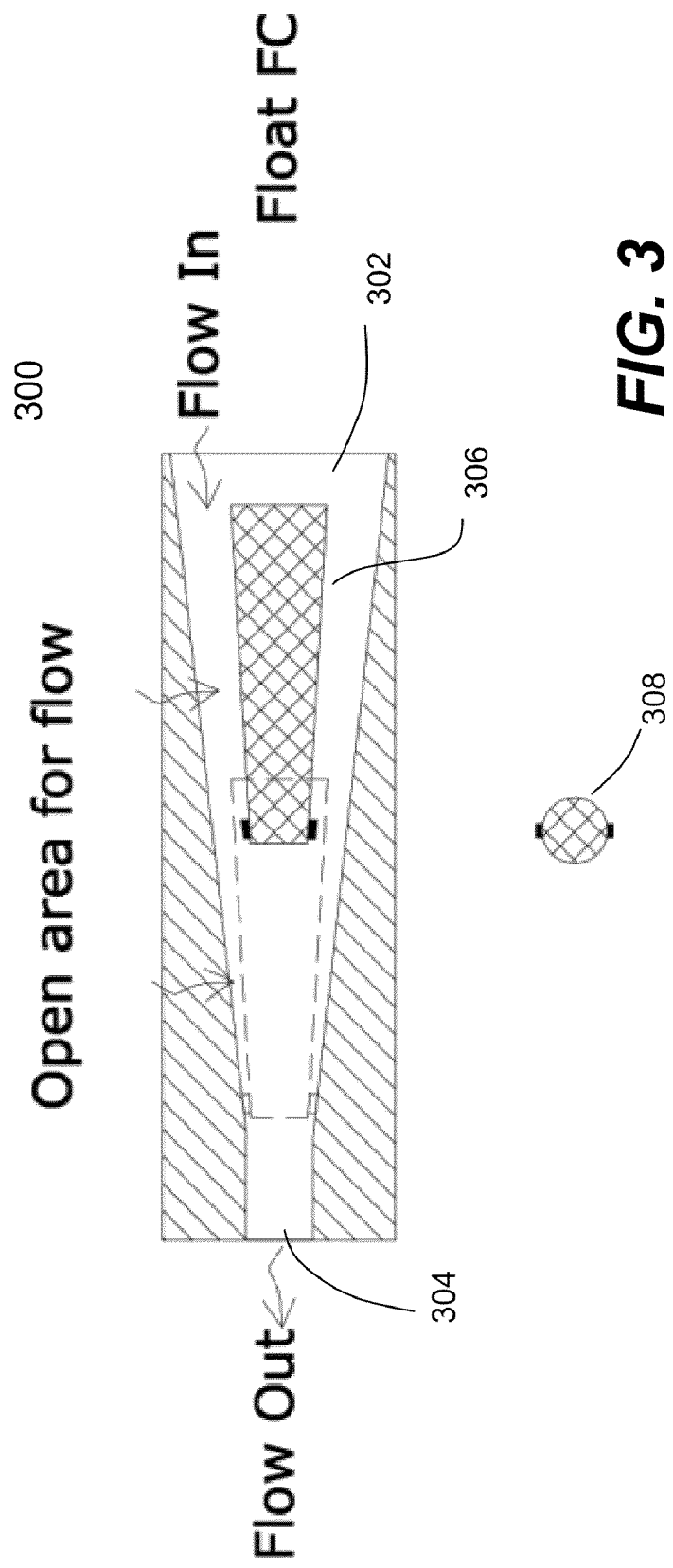
FIG. 3 shows an exemplary design of a flow-regulating device that includes an opening on one end for receiving a liquid that exits from another end thereof.

According to one embodiment, the flow-regulating device in one or more inlets of the manifold is a cylindrical insert, whose downstream end is fixed in place, while the upstream end is able to move forwards and backwards in response to the liquid flow impinging on the upstream end. This flow-regulating device is a hollow cylinder, supplied with openings in the side walls of the cylinder, which allows the liquid to enter the core of the cylinder. The end of the device facing downstream to the direction of the flow is open, allowing the fluid to exit downstream that has entered the cylinder body via the openings in the side wall of the cylinder. The upstream end is closed. Liquid flowing down the pipe impinges on the closed end, imparting a downstream force on the flow-regulating device, which in turn causes the amount of openings in the side wall to be reduced, limiting flow through the device. Given the description herein, other designs of a flow-regulating device are possible, for example, a first part is a tube fixed in place and the second part is something like a corn (i.e., bullet shape) that can be pushed in or pulled out by the pressure in the liquid to regulate the flow pressure. FIG. 3 shows an exemplary design 300 that includes an opening on one end 302 for receiving a liquid that exits from another end 304. The flow rate through the design 300 is regulated by a structure 306 that moves in or out along the structure 306. In one embodiment, the structure 306 appears a corn plug with sparsely spaced extended parts to prevent the structure 306 from blocking the flow of the liquid. According to one embodiment, the cross-section of the structure 306 is in round shape 308 as shown FIG. 3, although other shapes may be possible.

Depending on application, there are two or more tanks, where the liquids therein are at equal vertical heights. The tanks contain total liquid volumes which will, when combined, achieve a desired final mix ratio of the liquids. By using a self-adjusting flow-regulating device in at least one of the outlet pipes synchronizes the flow of liquid from a corresponding tank with flows of liquids from other tanks, to maintain controlled drainage from all tanks at all times. This ensures that the instantaneous ratio of the individual liquids sent to the common outlet feeding into a receiving tank is the same as the overall ratio of the individual liquids being combined or mixed in their entirety. As a result, large-scale segregation of the individual liquids in the common receiving tank is prevented.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A dispensing system comprising:
   a plurality of tanks, each of the tanks including an overflow outlet to limit a liquid therein to a certain measurement, and an array of volumetric outlets spaced apart, vertically arranged and converging into a single pipe, each of the volumetric outlets indicating a measured volume, wherein respective overflow outlets of the tanks are located at a specified height and corresponding to the volumetric outlets of the tanks for respective measured volumes, each of the volumetric outlets is located at the same height as one of the overflow outlets; and
   a dispensing assembly including a manifold coupled to the volumetric outlets of the tanks via respective pipes, and further a flow-regulating device in at least one but not all of the pipes to control a flow of the liquid coming downwards from each of the tanks through one of the volumetric outlets thereof.

2. The dispensing system as recited in claim 1, wherein the flow-regulating device is controlled by a manual valve for setting a coarse flow of the liquid.

3. The dispensing system as recited in claim 1, wherein the flow-regulating device is an elongated float including a first end and a second end with openings interposed between the two ends, where the fluid upstream passes around the second end, enters the openings and exits downstream from the first end.

4. The dispensing system as recited in claim 3, wherein the openings in the flow-regulating device are reduced when a pressure in the liquid increases to push the second end; or the openings in the flow-regulating device are increased when a pressure in the liquid reduces to release the second end.

5. The dispensing system as recited in claim 3, wherein the first end is fixed while the second end moves in accordance with a pressure in the liquid coming downstream.

6. The dispensing system as recited in claim 3, wherein the first end is hollow and the second end is solid.

7. The dispensing system as recited in claim 3, wherein the openings interposed between the two ends are spring-like structure to allow the second end to flex inward or outward.

8. The dispensing system as recited in claim 3, wherein the openings interposed between the two ends are grooves to allow the second end to flex inward or outward.

9. The dispensing system as recited in claim 1, wherein a cross-section area of the tanks keeps a ratio corresponding to a mixing ratio of liquids from the tanks being mixed.

10. The dispensing system as recited in claim 9, wherein an instantaneous ratio of the liquids feeding into a common receiving tank is substantially identical to an overall ratio of the liquids being combined or mixed in their entirety.

11. A dispensing system comprising:
    a first tank, for storing a first chemical liquid, including an overflow outlet to limit the first chemical liquid therein to a certain measurement, and an array of volumetric outlets spaced apart, vertically arranged and converging into a first pipe;
    a second tank, for storing a second chemical liquid, including an overflow outlet to limit the second chemical liquid therein to a certain measurement, and an array of volumetric outlets spaced apart, vertically arranged and converging into a second pipe, and
    a dispensing assembly including a manifold coupled to the first and second pipes, and further a flow-regulating device in one of the two pipes to control flows of the first and second chemical components coming downwards from the first and second tanks through one of the volumetric outlets on the first and second tanks, wherein an instantaneous ratio of the first and second chemical components feeding into a common receiving tank is substantially identical to an overall ratio of the first and second chemical components being combined or mixed in their entirety.

12. The dispensing system as recited in claim 11, wherein the flow-regulating device is controlled by a manual valve for setting a coarse flow.

13. The dispensing system as recited in claim 11, wherein the flow-regulating device is an elongated float including a first end and a second end with openings interposed between the two ends, where a fluid upstream passes around the second end, enters the openings and exits downstream from the first end.

14. The dispensing system as recited in claim 13, wherein the openings in the flow-regulating device are reduced when a pressure in the liquid increases to push the second end; or the openings in the flow-regulating device are increased when a pressure in the liquid reduces to release the second end.

15. The dispensing system as recited in claim 13, wherein the first end is fixed while the second end moves in accordance with a pressure in the liquid coming downstream.

16. The dispensing system as recited in claim 13, wherein the openings interposed between the two ends are spring-like structure to allow the second end to flex inward or outward.

17. The dispensing system as recited in claim 13, wherein the openings interposed between the two ends are grooves to allow the second end to flex inward or outward.

18. The dispensing system as recited in claim 11, wherein the flow-regulating device is a hollow structure in which there is a corn shaped plug that moves in or out along the flow-regulating device in response to a pressure in the liquid.

19. The dispensing system as recited in claim 11, wherein a cross-section area of the tanks keeps a ratio corresponding to the overall ratio of the first and second chemical components being mixed.

20. The dispensing system as recited in claim 11, wherein the first chemical component is gasoline and the second chemical component is ethanol.

* * * * *